W. HELLWIG.
CHICKEN HOUSE.
APPLICATION FILED MAY 17, 1915.
1,218,259.
Patented Mar. 6, 1917.
2 SHEETS—SHEET 2.
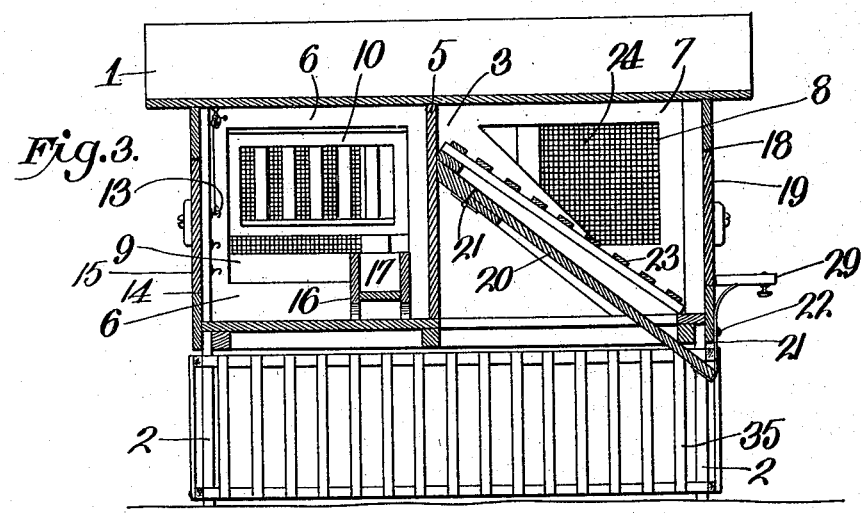
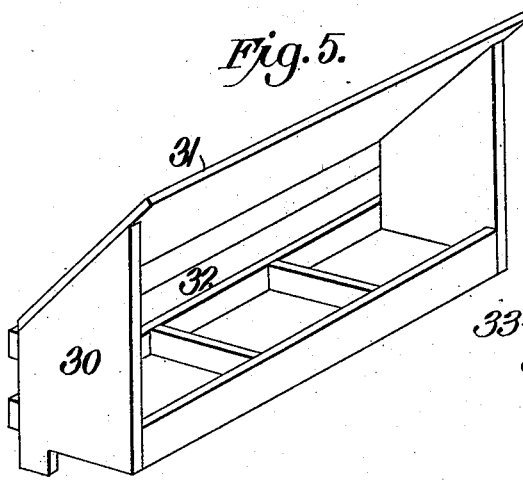
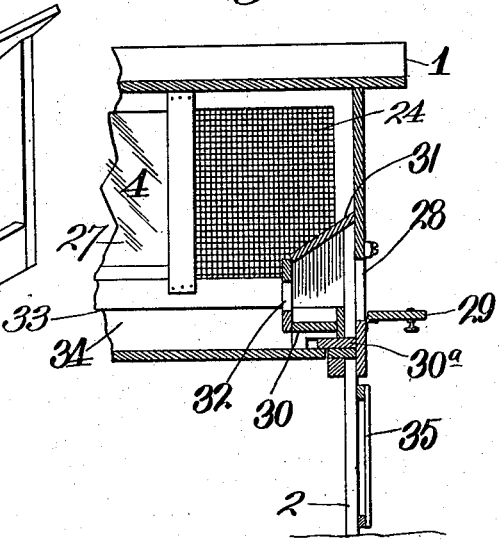
WITNESSES:
Frank R. Glow
H. C. Rodgers
INVENTOR
William Hellwig
BY
George F. Sharpe
ATTORNEY

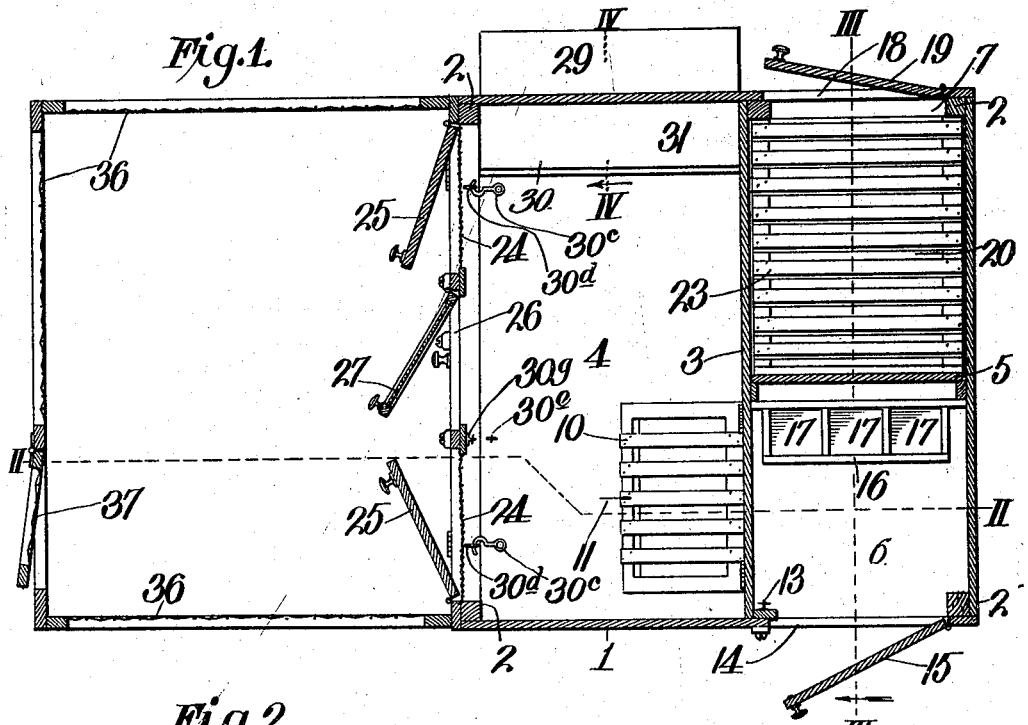
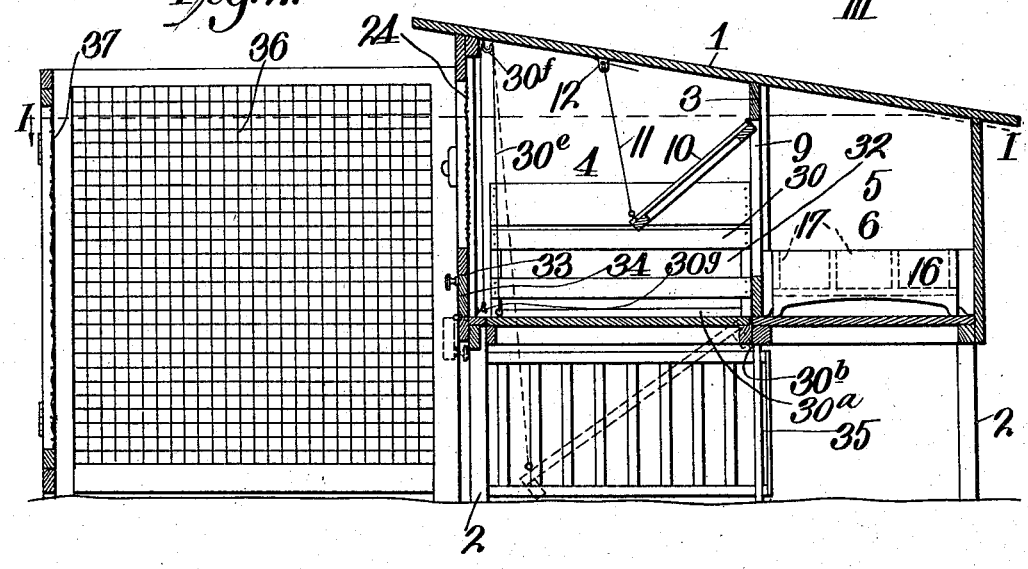

UNITED STATES PATENT OFFICE.

WILLIAM HELLWIG, OF KANSAS CITY, KANSAS.

CHICKEN-HOUSE.

1,218,259. Specification of Letters Patent. Patented Mar. 6, 1917.

Application filed May 17, 1915. Serial No. 28,778.

*To all whom it may concern:*

Be it known that I, WILLIAM HELLWIG, a citizen of the United States, residing at Kansas City, in the county of Wyandotte and State of Kansas, have invented certain new and useful Improvements in Chicken-Houses, of which the following is a specification.

This invention relates to chicken houses and my object is to produce a structure enabling a city dweller to keep chickens in a small space conveniently and under healthy conditions and surroundings through all seasons of the year.

With this general object in view the invention consists in certain novel and peculiar features of construction and organization of parts as hereinafter described and claimed; and in order that it may be fully understood reference is to be had to the accompanying drawings, in which:—

Figure 1, is a horizontal section of a chicken house embodying my invention, the section being taken on the line I—I of Fig. 2.

Fig. 2, is a section taken on the line II—II of Fig. 1.

Fig. 3, is a section taken on the line III—III of Fig. 1.

Fig. 4, is a section taken on the line IV—IV of Fig. 1.

Fig. 5 is a detailed perspective view of the feeding and drinking trough for the chickens.

In the said drawings, 1 indicates a chicken house, preferably of capacity to accommodate about a dozen chickens, and said house, which is preferably rectangular in form, is supported about two feet above the ground on corner posts 2, which posts preferably constitute a part of the framework of the house. The house is divided by a vertical transverse partition 3 into a front chamber 4 and a rear chamber, and the latter is divided by a vertical longitudinally disposed partition 5 into a nesting chamber 6 and a roosting chamber 7. The partition 3 is provided with a trapezoidal opening 8 establishing communication between chambers 4 and 7, and said partition 3 is also provided with an opening 9 establishing communication between chambers 4 and 6.

As it is desirable however to prevent the chickens from roosting in chamber 6, said opening 9 is controlled by a hinged door 10 adapted to be closed at night and to be held open in the day time by any suitable means, such for example as a cable 11, extending from the door up over a guide sheave 12, secured to the roof of the house, said cable preferably extending downward and outward for attachment to a hook or equivalent device 13 for holding the door open, substantially as shown in Fig. 3, which cable is always accessible through an opening 14, giving access to the chamber 6, said opening being provided with a controlling door 15. The chamber 6 is provided with a box 16 divided into a number of nest chambers 17. The roosting chamber 7 is also accessible through an opening 18 controlled by a door 19, and said doors are adapted to be securely fastened by padlocks or equivalent devices, not shown.

The bottom 20 of the roosting chamber is inclined downwardly and outwardly toward the side of the house containing opening 18 and is hinged at the upper end at 21 and its free end is detachably secured in the position shown in Fig. 3 in any suitable manner.

In practice it will be securely fastened in such position but for convenience it is shown as supported by a strap 21 detachably engaging a button 22. Arranged above and substantially parallel with the bottom 20 is a slatted platform or perch 23 upon which the chickens will roost at night. The front wall of chamber 4 is in the form of a frame provided with screened windows 24 equipped with solid shutters 25 which may be closed and secured in closed position. Between the windows said frame is formed with a door opening 26, provided with a glass paneled door 27.

By this arrangement it will be seen that in inclement weather the chickens may be confined within chamber 4 and be protected without shutting off the light from them. Upon other days the chickens may be prevented from leaving chamber 4 by leaving door 27 closed and opening shutters 25.

To provide for feeding the chickens, one of the side walls is provided with an opening 28 which may be closed by a hinged door 29, preferably susceptible of being securely fastened in closed position. Through opening 28 grain may be poured into a feed trough 30 arranged against the wall and resting upon a rigid strip 30ª overlapping one side margin of the bottom of chamber 4, which bottom is hinged at its rear margin at 30b so as to be capable of swinging down, as indicated by dotted lines, Fig. 2. Near its front or free edge the bottom will be provided with a pair of hooks 30c, adapted for engagement with eye bolts 30d, secured to a rigid part of the house, so as to support the bottom of said chamber normally in elevated position. For convenience in raising the bottom from its lowered to its normal position, a cable 30e is attached to the bottom and extends up over a sheave 30f secured to the roof or at any other suitable overhead point, the cable extending downward from the sheave for detachable engagement with a hook 30g, attached to a part of the house. When it is desired to lower the said bottom, the cable is disengaged from said hook 30g and then the fastening hooks 30c are disengaged from the eye bolts 30b, after which the said bottom may be lowered. Of course, the cable 30e and its connections may be depended upon if desired to support the bottom in normal position as well as utilized for raising and lowering said bottom.

The top of the trough is inclined as at 31 so that chickens cannot roost thereon and the inner wall is provided with an opening 32 through which the chickens can stick their heads to obtain access to the grain in the feed box or to water in a pan, not shown, set in the feed box, the feed box being preferably divided into at least three compartments, as shown in Fig. 5, so that different kinds of feed may be supplied without becoming mixed. A feed box of the kind described will keep the feed for the chickens clean as the opening 32 is too small for a chicken to pass through. To enable the chickens to leave the house or to enter the same I provide the front wall of the house with an opening 33 below the door opening 26 by preference, and said opening is controlled by a drop hinged door 34, the arrangement being such that when said door is swung open it will hang downward as, indicated by dotted lines, Fig. 2, so as to be out of the way of the chickens and at the same time aid in shading the space under the chicken house. The space under the chamber 4 of the house is inclosed at three sides by a fence 35, through which the chickens can not pass, this space constituting a space shaded by the house wherein the chickens may rest during the heat of the day, said space being partly shaded by the door 34 when in its dropped or open position.

In places where the house cannot be built into a poultry yard, I have made provision for a small yard in front of the house and in communication with the inclosed space below the chicken house. To form this yard I preferably employ three screened walls 36 of such height that a chicken can not well fly over them, one of the walls being provided with an opening controlled by a gate 37 to give access to the chicken yard when necessary.

In practice the bottom of chamber 4 will be covered for several inches with straw for the comfort of the chickens, particularly when the weather is too inclement to let the chickens out of the yard, the chamber being supplied with air by opening one or both of shutters 25. To permit the chickens to pass at will into the yard or from the yard into chamber 4, the door 34 is opened, as hereinbefore explained. When it is desired to catch a chicken it can be readily accomplished in the evening or at any other time when the chickens are roosting by opening door 19, it being of course, clear that to prevent unauthorized persons reaching the chickens through said door it should be provided with proper fastening devices, as hereinbefore suggested. To obtain access to the nests the door 15 may be opened. It will thus be seen that it is only necessary to enter the chicken yard occasionally, that is, at such times as it is desired to thoroughly cleanse the floor of chamber 4 and to perform this operation it is preferably lowered and flushed, preferably with a hose. The nesting chamber is also conveniently accessible for cleaning purposes and likewise the roosting chamber, the bottom of the latter being also preferably lowered and the hose turned upon it and upon the perch so that the said parts may be thoroughly and easily cleaned.

With a house equipped with a yard of the character described or located in a suitably fenced yard, chickens may be raised without annoyance to neighbors and under very healthy conditions. They are safe from rats because of the height of the floor of the house from the ground, and when all the doors are closed in winter they are thoroughly protected from cold without the use of a heating appliance.

The invention is susceptible of modification in various particulars without departing from the principle of construction involved and I reserve the right to make such changes as properly fall within the spirit and scope of the appended claims.

I claim:

1. A chicken house supported above the ground level and divided into a front chamber and two rear chambers communicating with the front chamber, one of the latter forming a nest chamber and the other a roosting chamber, means for closing communication between the front chamber and the nest chamber, a door controlled opening in one side wall of the house, a feed trough secured within the house in communication with said door opening and provided with an opening in its inner side through which the chickens may thrust their heads for feeding and drinking purposes; the front wall of said front chamber being provided with an opening in its lower portion and a door controlling said opening and hinged at its lower edge so that when open it shall depend below the bottom of the said front chamber to assist in shading the space thereunder.

2. A chicken house partitioned to form a front chamber having a bottom and a roosting chamber having a bottom opening, the partition between said chambers having an opening in its upper outer half, a door controlled opening in the outer wall of the house communicating with the roosting chamber, an inclined skeleton perch secured in said roosting chamber and dividing the roosting chamber into an upper portion accessible through the said opening in said partition and a lower portion accessible through the opening in the bottom of said chamber, and a hinged bottom for said chamber extending from a point within the same below the upper portion of said perch, downwardly and outwardly through the opening in the bottom of the roosting chamber and preventing access to the upper portion of the latter, and adapted to swing to a pendant position to give access to the perch from below or to permit matter cleaned from the perch to drop through the opening in the bottom of the roosting chamber, to the ground.

In testimony whereof, I affix my signature, in the presence of two witnesses.

WILLIAM HELLWIG.

Witnesses:
H. C. RODGERS,
G. Y. THORPE.

Copies of this patent may be obtained for five cents each, by addressing the "Commissioner of Patents, Washington, D. C."